United States Patent [19]
Murata

[11] Patent Number: 5,914,789
[45] Date of Patent: Jun. 22, 1999

[54] FACSIMILE APPARATUS WITH PRINTER FUNCTION FOR CONNECTING TO AN EXTERNAL COMPUTER

[75] Inventor: Kazuyuki Murata, Kyoto, Japan

[73] Assignee: Matsushita Electric Industrial Co., Ltd., Osaka, Japan

[21] Appl. No.: 08/631,881

[22] Filed: Apr. 16, 1996

Related U.S. Application Data

[63] Continuation of application No. 08/352,084, Nov. 30, 1994, abandoned.

[30] Foreign Application Priority Data

Nov. 30, 1993 [JP] Japan .................................. 5-300121

[51] Int. Cl.$^6$ .............................. H04N 1/32; H04N 1/00
[52] U.S. Cl. ......................... 358/442; 358/400; 358/468
[58] Field of Search .................................. 358/400, 401, 358/437, 442, 444, 468; 379/93, 100

[56] References Cited

U.S. PATENT DOCUMENTS

| | | | |
|---|---|---|---|
| 4,652,933 | 3/1987 | Koshiishi | 358/442 |
| 5,065,427 | 11/1991 | Godbole | 379/100 |
| 5,091,790 | 2/1992 | Silverberg | 358/434 |

FOREIGN PATENT DOCUMENTS 62-248360 10/1987 Japan .
1-294071 11/1989 Japan .
3-210870 9/1991 Japan .

*Primary Examiner*—Thomas D. Lee
*Attorney, Agent, or Firm*—McDermott, Will & Emery

[57] ABSTRACT

In a facsimile apparatus with a printer function, a facsimile receiver receives facsimile image data which is encoded according to a predetermined first facsimile coding method and is transmitted from a further facsimile apparatus of the other party, and a host interface interfaces the facsimile apparatus with an external computer and receives facsimile image data which is encoded according to a predetermined second facsimile coding method and is transmitted from the external computer. Further, a decoder decodes the received facsimile image data into image data, and a printer forms an image of the image data on a paper in response to the decoded image data. Furthermore, a MODEM is provided having a facsimile MODEM mode and a data communication MODEM mode which is switched over therebetween in response to command data transmitted from the external computer through a host interface. In the facsimile MODEM mode, the MODEM modulates a carrier signal according to facsimile image data and demodulates a modulated carrier signal according to facsimile image data received from the external computer. In the data communication MODEM mode, the MODEM modulates a carrier signal according to digital data received from the external computer and demodulates a modulated carrier signal according to digital data.

5 Claims, 5 Drawing Sheets

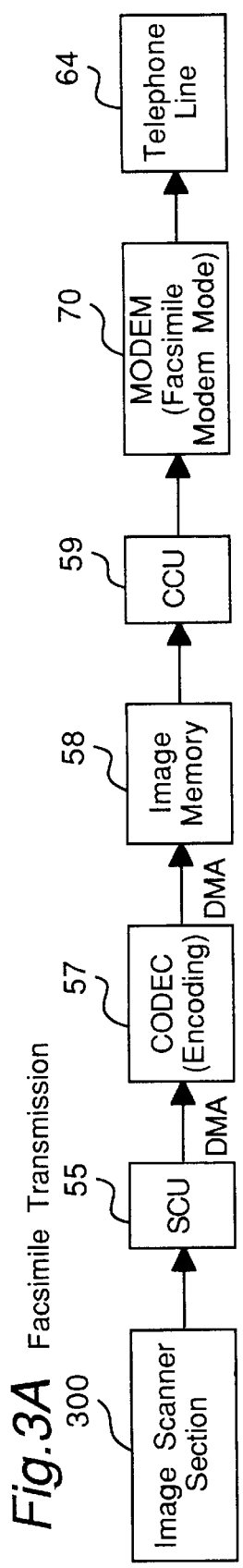
*Fig.3A* Facsimile Transmission
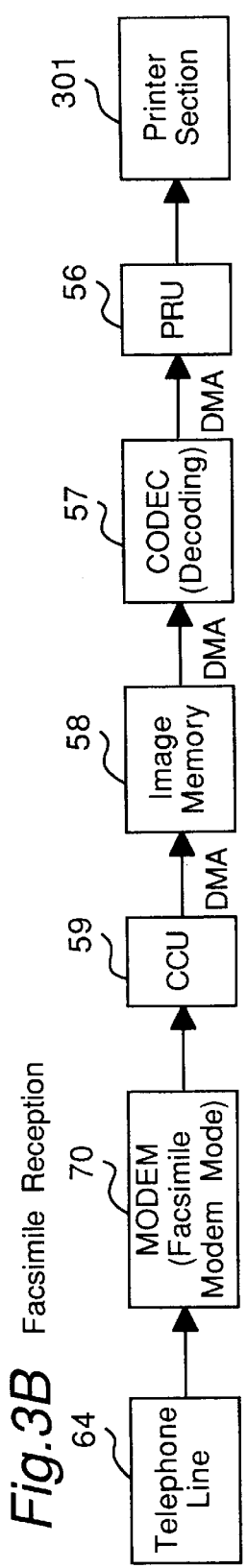
*Fig.3B* Facsimile Reception
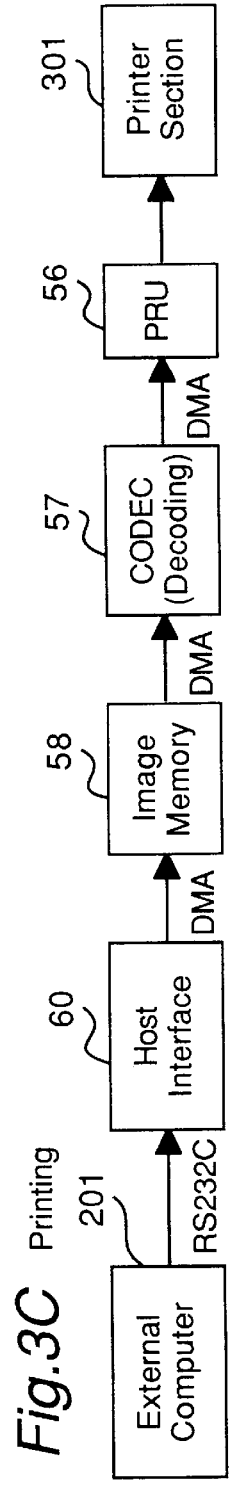
*Fig.3C* Printing
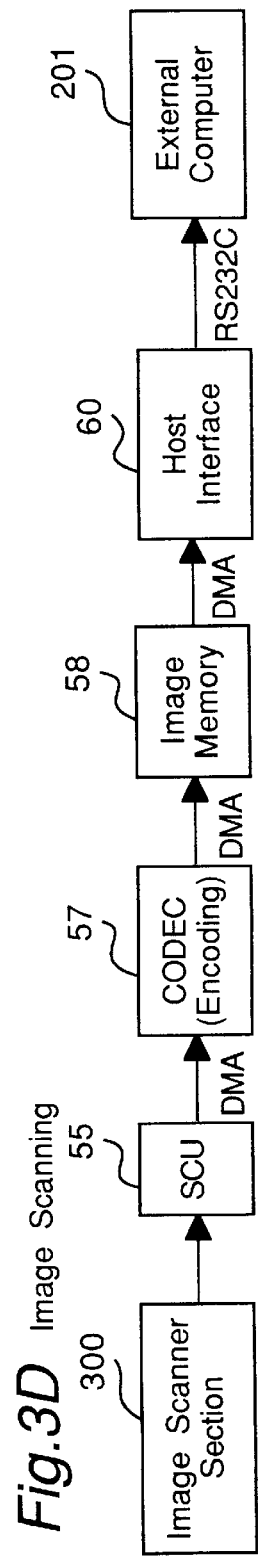
*Fig.3D* Image Scanning

FACSIMILE APPARATUS WITH PRINTER FUNCTION FOR CONNECTING TO AN EXTERNAL COMPUTER

This is a continuation application of application Ser. No. 08/352,084 filed Nov. 30, 1994, now abandoned.

BACKGROUND OF THE INVENTION

1. Field of the Invention

The present invention relates to a facsimile apparatus, and in particular, to a facsimile apparatus provided with a printer function which is capable of connecting to an external computer.

2. Description of the Related Art

Recently, there has been proposed a facsimile apparatus 200a provided with interface means for connection with an external computer 201 for the purpose of using a printer function section of the facsimile apparatus as a printer apparatus for the external computer.

FIG. 4 shows the conventional facsimile apparatus 200a provided with the printer function. First of all, an operation of an image scanner section 300 will be now described with reference to FIG. 4.

Referring to FIG. 4, documents or originals 101 to be read is placed on a document setting section 100 on which a plurality of documents 101 can be placed. The documents 101 are transferred one by one onto a paper supply roller 102 by means of a document pick up roller 120. The paper supply roller 102 feeds the document 101 transferred one by one into a reading unit 103 of the facsimile apparatus 200a. The reading unit 103 is constituted by integrating, in a form of unit, a contact type CCD image sensor for reading an image of a document scanning the image of the document in a main scanning direction and converting the image into an image signal, an LED array for illuminating the document 101, and an optical system for focusing reflected light from the document 101 onto the CCD image sensor. By moving the document 101 on the reading unit 103, an image of the document 101 is scanned in a sub-scanning direction so as to be read. The document after reading the image of the document is fed by a document exhausting roller 104 so as to be successively ejected onto a document exhausting tray 105.

Next, the following describes an operation of a printer section 301.

A plurality of printing papers 108 are set into and held by a printing paper cassette 109. A paper supply pickup roller 122 transfers the printing papers 108 one by one to a paper supply roller 110. Then, the paper supply roller 110 supplies the printing papers 108 fed one by one towards a photoconductive drum 111 provided within the facsimile apparatus 200a. The photoconductive drum 111 rotating in a direction indicated by an arrow S is electrically charged uniformly with electric charges by an electric charger 112. A beam of laser light modulated according to an image signal is emitted from a laser scanner unit 121 including a semiconductor laser, a polygon mirror and an optical system. A beam of emitted laser light is reflected on a mirror 113, and is scanned in a direction of an axis of the photoconductive drum 111 on the surface of the photoconductive drum 111, so as to form an electrostatic latent image onto the photoconductive drum 111. A developing unit 114 develops the electrostatic latent image formed on the photoconductive drum 111 with toner so as to form a toner image thereon. The toner image formed on the photoconductive drum 111 is transferred onto the printing paper by means of a transfer charger 115. Furthermore, toner cleaner 116 collects the toner remaining on the photoconductive drum 111.

The toner image formed on the printing paper is thermally fixed on the printing paper 108 by a fixing roller 117. The printing paper 108 on which the image of the document has been printed is ejected out of the facsimile apparatus 200a by a paper exhausting roller 118, and then, the printed printing paper 108 is successively stacked on a printing paper exhausting tray 119. The above-mentioned image forming process is an electrophotographic process which is well-known to those skilled in the art.

Then the following describes an electric operation of the conventional facsimile apparatus 200a provided with the printer function with reference to FIG. 5 showing a block diagram of the conventional facsimile apparatus 200a provided with the printer function shown in FIG. 4.

Referring to FIG. 5, a microprocessor unit (referred to as an MPU hereinafter) 151 controls the entire conventional facsimile apparatus 200a shown in FIGS. 4 and 5. A bus 163 is provided for connection with the MPU 151, and the bus 163 is connected to the followings:

(a) a read only memory (referred to as a ROM hereinafter) 152;

(b) a random access memory (referred to as a RAM hereinafter) 153;

(c) a direct memory access controller (referred to as a DMAC hereinafter) 154;

(d) a scanner control unit (referred to as an SCU hereinafter) 155;

(e) a printer control unit (referred to as a PRU hereinafter) 156;

(f) an encoder and decoder circuit (referred to as a CODEC hereinafter) 157;

(g) an image memory 158 of a RAM;

(h) a communication control unit (referred to as a CCU hereinafter) 159;

(i) a host interface 160; and (j) a font memory 161.

The ROM 152 stores not only a control program for controlling the facsimile apparatus 200a which is executed by the MPU 151 but also control data required when executing the control program. The RAM 153 is used as a work area required by the MPU 151. The SCU 155 executes an image signal processing process for processing an image signal sent from the image scanner section 300, such as a shading correction process, a binarizing process or the like. The PRU 156 controls a printing process of the printer section 301 by outputting an image signal to the printer section 301 in synchronous with the printing process of the printer section 301.

On the other hand, the CODEC 157 executes encoding and decoding of the image signal. The image memory 158 stores image data in a form of bit map, which are obtained by converting the encoded facsimile image data or print data sent from an external computer 201 into bit map data. The CCU 159 executes communication control through a telephone line 164. The DMAC 154 is provided for use in transmitting image data among the CCU 159, the image memory 158, the CODEC 157, the SCU 155, and the PRU 156. The DMAC 154 is provided with a plurality of DMA channels. The host interface 160 executes transmission and reception of data with the external computer 201 according to an RS-232C protocol through an RS-232C line, which is an electric standard line for serial communication well known to those skilled in the art. The font memory 161 stores outline font data for use in converting character code data input from the external computer 201 into bit map data.

The following describes a control flow of the image signal in the stage of transmitting a document image through facsimile transmission.

An image signal read by the image scanner section 300 is input to the SCU 155, which then performs the binarizing process for the image signal and outputs binarized image data. The binarized image data sent from the SCU 155 is transferred every horizontal scanning line to the CODEC 157 through a DMA transfer by the DMAC 154. The CODEC 157 encodes the binarized image data sent from the SCU 155 so as to generate encoded facsimile image data. The encoded image data is transferred to the image memory 158 through a DMA transfer by the DMAC 154. When the encoded facsimile image data of one page of the document is stored in the image memory 158, the encoded facsimile image data of one page is transferred to the CCU 159 through a DMA transfer by the DMAC 154, and then the CCU 159 transmits the encoded facsimile image data in a form of a facsimile image signal through the telephone line 164 to a further facsimile apparatus of a destination.

Then, the following describes a control flow of the image signal in the stage of receiving a document image through facsimile reception.

Encoded facsimile image data are received by the CCU 159 from the further facsimile apparatus of the destination through the telephone line 164, and then the CCU 159 transfers the encoded facsimile image data to the image memory 158 through a DMA transfer by the DMAC 154. When the encoded facsimile image data of one page of the document is stored in the image memory 158, the printer section 301 is activated. The DMAC 154 successively transfers the encoded image data of one page stored in the image memory 158 to the CODEC 157 through a DMA transfer. The CODEC 157 decodes the encoded facsimile image data. The DMAC 154 transfers line by line image data decoded by the CODEC 157 to the PRU 156 through a DMA transfer. The PRU 156 outputs the decoded image data to the printer section 301 so as to print an image of the decoded image data.

Next, the following describes an operation of recording or printing print data sent from the external computer 201 by means of the printer section 301 of the conventional facsimile apparatus 200*a*. The print data sent from the external computer 201 is received by the host interface 160 through the RS-232C line 162. The print data includes a character code, a printer control code, and so forth. These print data is analyzed by the MPU 151. The outline font data is read out, in the case of necessary, from the font memory 161, and is converted into bit map data which are then stored in the image memory 158. After a print image of one page is converted into bit map image data, the DMAC 154 transfers line by line the bit map image data of one page from the image memory 158 to the PRU 156 through a DMA transfer. The PRU 156 outputs bit map print image data in synchronous with the operation of the printer section 301. This operation of recording or printing print data sent from the external computer 201 by the printer section 301 of the conventional facsimile apparatus 200*a* is disclosed in, for example, the Japanese patent laid-open publication No. 1-294071.

It is further proposed in, for example, the Japanese patent laid-open publication No. 3-210870, that the external computer 201 utilizes a facsimile modulator and demodulator (a modulator and demodulator is referred to as a MODEM hereinafter) provided in the CCU 159 through the host interface 60 so as to allow communication through the telephone line 64 to be performed in the above-mentioned conventional facsimile apparatus 200*a* provided with the printer function.

However, in the above-mentioned arrangement of providing the printer function for the conventional facsimile apparatus 200*a*, it is necessary to provide a memory for storing outline font data, as well as hardware or a high-performance microprocessor for generating raster data or bit map image data from the outline font data, resulting in increase in the manufacturing cost.

In order to solve the above-mentioned problem, it can be considered that the external computer 201 generates bit map data and outputs the bit map data to the facsimile apparatus 200*a* provided with the printer. However, the above-mentioned method has such a drawback that the amount of image data to be transferred from the external computer 201 to the conventional facsimile apparatus 200*a* provided with the printer increases, resulting in significantly increase in the data transmission time.

It can be further considered that the external computer 201 compresses the bit map data through an encoding process in order to reduce the amount of data. However, in the above-mentioned case, in the conventional facsimile apparatus 200*a* provided with the printer function, it is necessary to provide decoding means for decoding bit map data, resulting in increase in the manufacturing cost.

Furthermore, when using the document reading function of the facsimile apparatus 200*a* provided with the printer from the external computer 201, there is a remarkably great amount of image data outputted from the facsimile apparatus 200*a* provided with the orinter to the external computer 201. The above-mentioned arrangement has been accompanied by such a problem that a long data transmitting time is required.

Furthermore, in the conventional construction in which the external computer 201 communicates with a remote computer by means of a facsimile MODEM in the facsimile apparatus 200*a* provided with the printer, only communication in a half-duplex mode is permitted, and no standard has yet been established for error correction in the facsimile MODEM. In addition to this, it is impossible to perform the communication unless the remote computer of the other party employs a facsimile MODEM. In order to dissolve the above-mentioned problem, it can be considered to further provide a data MODEM for data communication purpose in the facsimile apparatus 200*a* provided with the printer function. However, when such a construction is adopted, this results in increase in the manufacturing cost.

SUMMARY OF THE INVENTION

The object of the present invention is therefore to provide a facsimile apparatus provided with a printer function having a lower manufacturing cost, which is capable of connecting to an external computer.

Another object of the present invention is to provide a facsimile apparatus provided with a printer function having a lower manufacturing cost, which is capable of performing not only data communication but also facsimile communication for data sent from an external computer.

A further object of the present invention is to provide a facsimile apparatus provided with a printer function having a lower manufacturing cost, which is capable of transmitting image data to an external computer.

In order to achieve the aforementioned objective, according to one aspect of the present invention, there is provided a facsimile apparatus with a printer function, comprising receiving means, operatively connected to a communication line, for receiving facsimile image data which is encoded according to a predetermined first facsimile coding method and is transmitted from a further facsimile apparatus of the other party;

interface means, operatively connected to an external computer, for interfacing said facsimile apparatus with said external computer and receiving facsimile image data which is encoded according to a predetermined second facsimile coding method and is transmitted from said external computer;

decoding means for decoding the facsimile image data received by said interface means into image data and for decoding the facsimile image data received by said receiving means into image data; and printer means for forming an image of the image data on a paper in response to the image data decoded by said decoding means.

In the above-mentioned facsimile apparatus, the first facsimile coding method is preferably the same as the second facsimile coding method.

According to another aspect of the present invention, there is provided a facsimile apparatus with a printer function, comprising:

printer means for forming an image of image data in response to inputted image data;

image reading means for reading an image of a document and converting the read image of the document into image data;

encoding means for encoding the image data converted by said image reading means into first facsimile image data according to a predetermined first facsimile coding method, and for encoding the image data converted by said image reading means into second facsimile image data according to a predetermined second facsimile coding method;

transmitting means, operatively connected to a communication line, for transmitting the first facsimile image data encoded by said encoding means to a further facsimile apparatus of the other party; and interface means, operatively connected to an external computer, for interfacing said facsimile apparatus with said external computer and transmitting the second facsimile image data encoded by said encoding means to said external computer.

In the above-mentioned facsimile apparatus, the first facsimile coding method is preferably the same as the second facsimile coding method.

According to a further aspect of the present invention, there is provided a facsimile apparatus with a printer function, comprising:

interface means, operatively connected to an external computer, for interfacing said facsimile apparatus with said external computer, receiving facsimile image data and digital data transmitted from said external computer and transmitting facsimile image data and digital data to said external computer;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line;

switching means for switching over the MODEM mode of said modulator and demodulator means between the facsimile MODEM mode and the data communication MODEM mode in response to command data transmitted from said external computer through said interface means; and printer means for forming an image of image data on a paper in response to facsimile image data demodulated by said modulator and demodulator means, and image data received from said external computer through said interface means.

According to a still further aspect of the present invention, there is provided a facsimile apparatus with a printer function, comprising receiving means, operatively connected to a communication line, for receiving facsimile image data which is encoded according to a predetermined first facsimile coding method and is transmitted from a further facsimile apparatus of the other party;

interface means, operatively connected to an external computer, for interfacing said facsimile apparatus with said external computer, receiving facsimile image data which is encoded according to a predetermined second facsimile coding method and is transmitted from said external computer, and transmitting to said external computer facsimile image data which is encoded according to the second facsimile coding method;

decoding means for decoding the facsimile image data received by said interface means into image data and for decoding the facsimile image data received by said receiving means into image data;

image reading means for reading an image of a document and converting the read image of the document into image data;

encoding means for encoding the image data converted by said image reading means into first facsimile image data according to the first facsimile coding method, and for encoding the image data converted by said image reading means into second facsimile image data according to the second facsimile coding method;

transmitting means, operatively connected to said communication line, for transmitting the first facsimile image data encoded by said encoding means to the further facsimile apparatus of the other party; and printer means for forming an image of the image data on a paper in response to the image data decoded by said decoding means.

In the above-mentioned facsimile apparatus, the first facsimile coding method is preferably the same as the second facsimile coding method.

According to a still more further aspect of the present invention, there is provided a facsimile apparatus with a printer function, comprising:

interface means, operatively connected to an external computer, for interfacing said facsimile apparatus with said external computer, receiving facsimile image data and digital data transmitted from said external computer and transmitting facsimile image data and digital data to said external computer;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line;

switching means for switching over the MODEM mode of said modulator and demodulator means between the facsimile MODEM mode and the data communication MODEM mode in response to command data transmitted from said external computer through said interface means;

decoding means for decoding facsimile image data, which is encoded according to a predetermined first facsimile coding method and transmitted from the further facsimile apparatus of the other party through said modulator and demodulator means, into image data, and for decoding facsimile image data, which is encoded according to a predetermined second facsimile coding method and transmitted from said external computer through said interface means, into image data; and printer means for forming an image of image data on a paper in response to image data decoded by said decoding means.

In the above-mentioned facsimile apparatus, the first facsimile coding method is preferably the same as the second facsimile coding method.

According to a still more further aspect of the present invention, there is provided a facsimile apparatus with a printer function, comprising:

interface means, operatively connected to an external computer, for interfacing said facsimile apparatus with said external computer, receiving facsimile image data and digital data transmitted from said external computer and transmitting facsimile image data and digital data to said external computer;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line;

switching means for switching over the MODEM mode of said modulator and demodulator means between the facsimile MODEM mode and the data communication MODEM mode in response to command data transmitted from said external computer through said interface means;

decoding means for decoding facsimile image data, which is encoded according to a predetermined first facsimile coding method and transmitted from the further facsimile apparatus of the other party through said modulator and demodulator means, into image data, and for decoding facsimile image data, which is encoded according to a predetermined second facsimile coding method and transmitted from said external computer through said interface means, into image data;

image reading means for reading an image of a document and converting the read image of the document into image data;

encoding means for encoding the image data converted by said image reading means into first facsimile image data according to the first facsimile coding method, said first facsimile image data being transmitted through said modulator and demodulator means and said communication line to said further facsimile apparatus of the other party, and for encoding the image data converted by said image reading means into second facsimile image data according to the second facsimile coding method, said second facsimile image data being transmitted through said interface means to said external computer; and printer means for forming an image of image data on a paper in response to image data decoded by said decoding means.

In the above-mentioned facsimile apparatus, the first facsimile coding method is preferably the same as the second facsimile coding method.

In the above-mentioned facsimile apparatus provided with the printer function of the present invention, said decoding means for decoding encoded facsimile image data received from said further facsimile apparatus of the other party and said decoding means for decoding encoded facsimile image data received from said external computer can be commonly used. Furthermore, it is unnecessary to provide the font memory 161 and any font rasterizing means or developing means for developing font data into bit map image data. This results in that the printer function can be added to the facsimile apparatus at a remarkably low cost.

Furthermore, in the case of utilizing a function for reading a document image from the external computer 201 under remote control, the facsimile apparatus provided with the printer of the present invention compresses the image data by means of said encoding means, and then outputs the compressed image data to the external computer. In this case, the transmission time for transmitting the image data to the external computer 201 can be reduced without increasing the manufacturing cost.

Furthermore, the facsimile apparatus of the present invention comprises said modulator and demodulator means or MODEM having the facsimile MODEM mode and the data communication MODEM mode, and said switching means for switching over the MODEM mode therebetween. The above-mentioned arrangement allows data communication and facsimile communication from the external computer 201 through the facsimile apparatus of the present invention to a further apparatus or computer of the other party, to be achieved without increasing the manufacturing cost.

In addition, one communication port of the external computer 201 can be used commonly for connection of a printer, an image scanner, and a communication MODEM. Therefore, so many communication ports are not required.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3A is a flow-chart showing a flow of image data in a facsimile transmission performed by the facsimile apparatus shown in FIG. 1;

FIG. 3B is a flow-chart showing a flow of image data in a facsimile reception performed by the facsimile apparatus shown in FIG. 1;

FIG. 3C is a flow-chart showing a flow of image data in a printing performed by the facsimile apparatus shown in FIG. 1;

FIG. 3D is a flow-chart showing a flow of image data in an image scanning performed by the facsimile apparatus shown in FIG. 1;

DETAILED DESCRIPTION OF THE PREFERRED EMBODIMENTS

Preferred embodiments according to the present invention will be described below with reference to the attached drawings.

Figure 4:
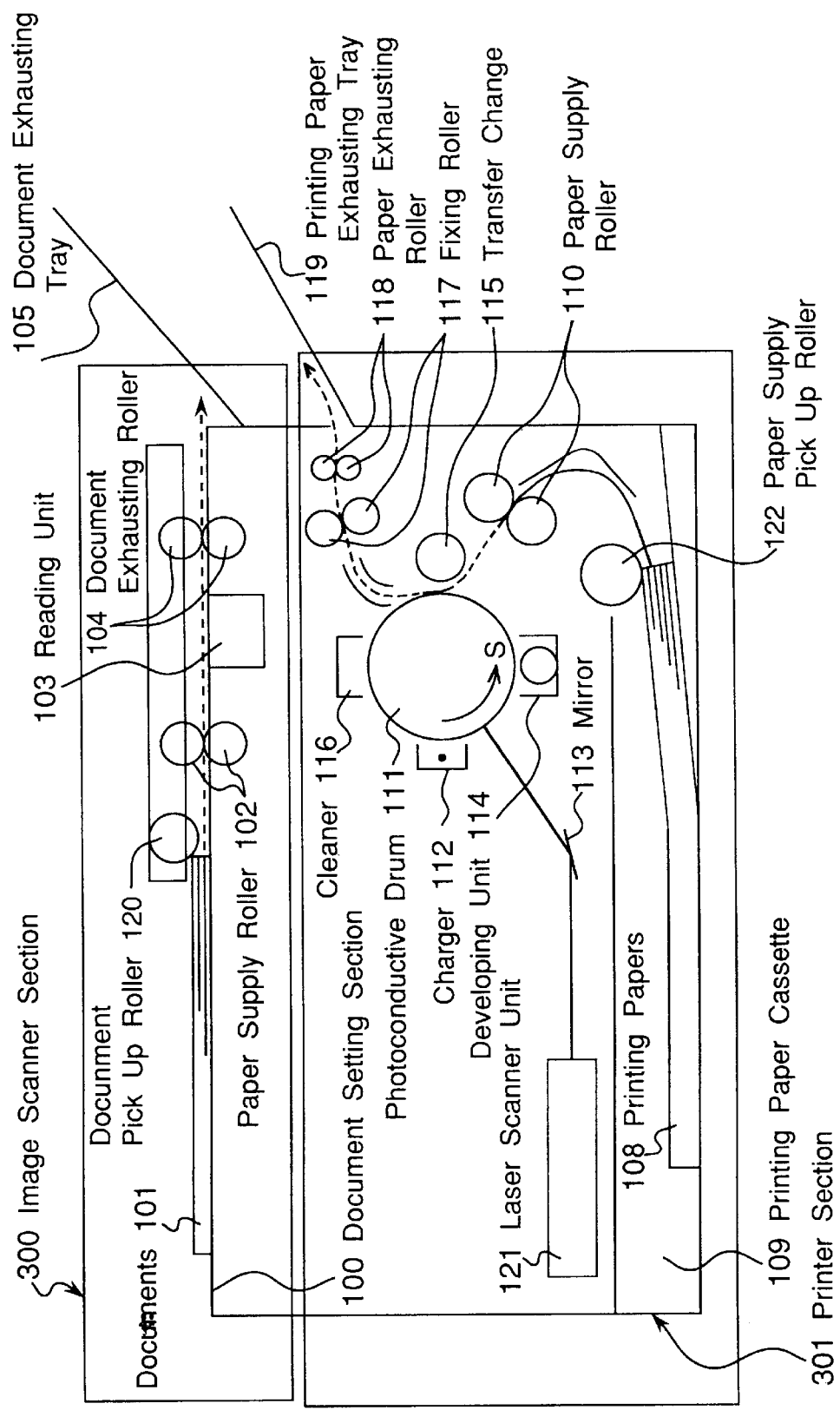
FIG. 4 is a schematic cross-sectional view of a conventional facsimile apparatus provided with a printer function.

A facsimile apparatus 200 provided with a printer function according to a preferred embodiment of the present invention has the same mechanical operation and mechanical construction as those of the conventional facsimile apparatus 200a provided with the printer function shown in FIG. 4, and therefore, no detailed description is provided therefor.

Figure 1:
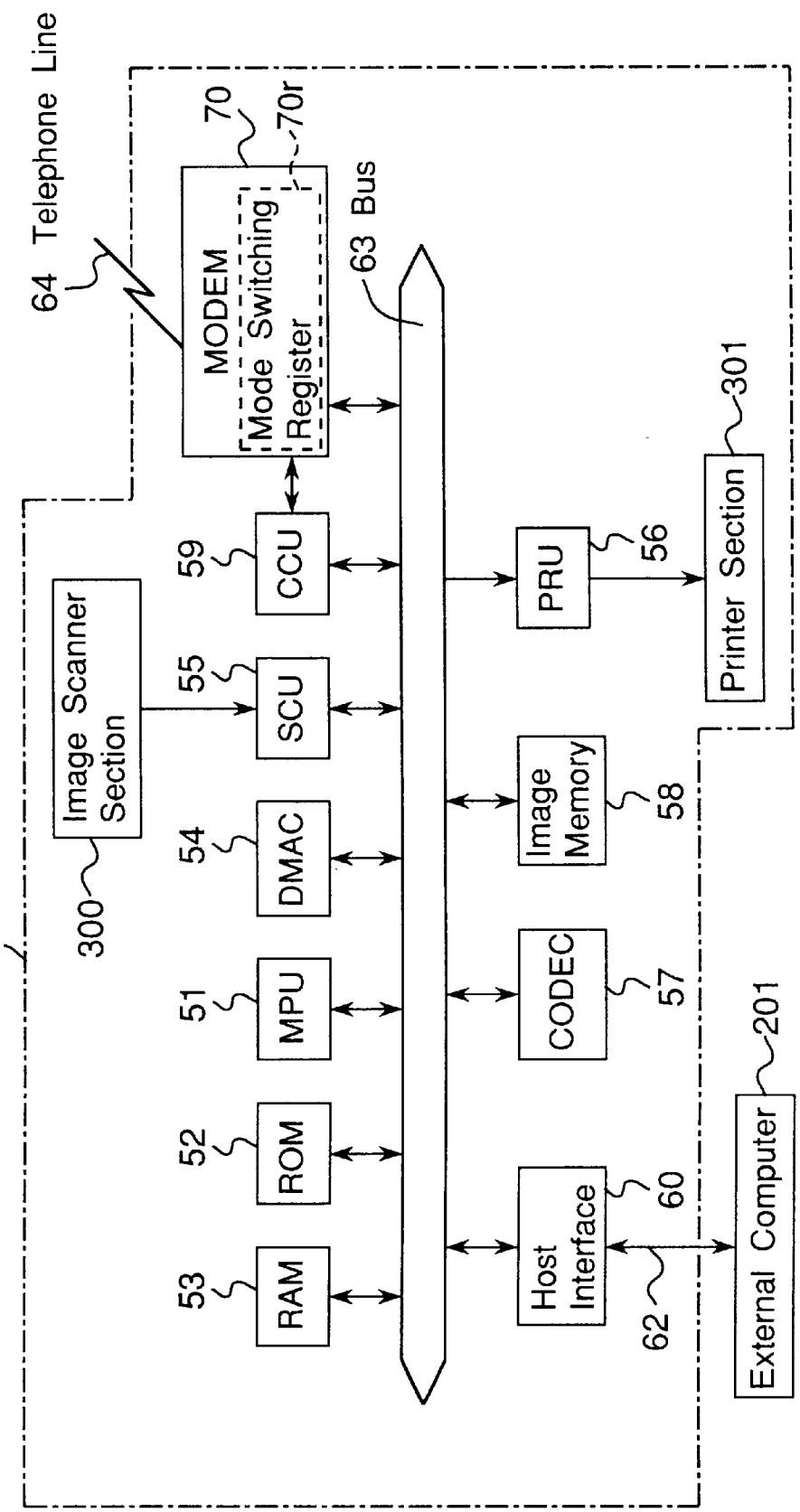
FIG. 1 is a block diagram of a facsimile apparatus provided with a printer function according to a preferred embodiment of the present invention.

FIG. 1 shows a block diagram of the facsimile apparatus 200 provided with the printer function according to the preferred embodiment of the present invention.

Figure 5:
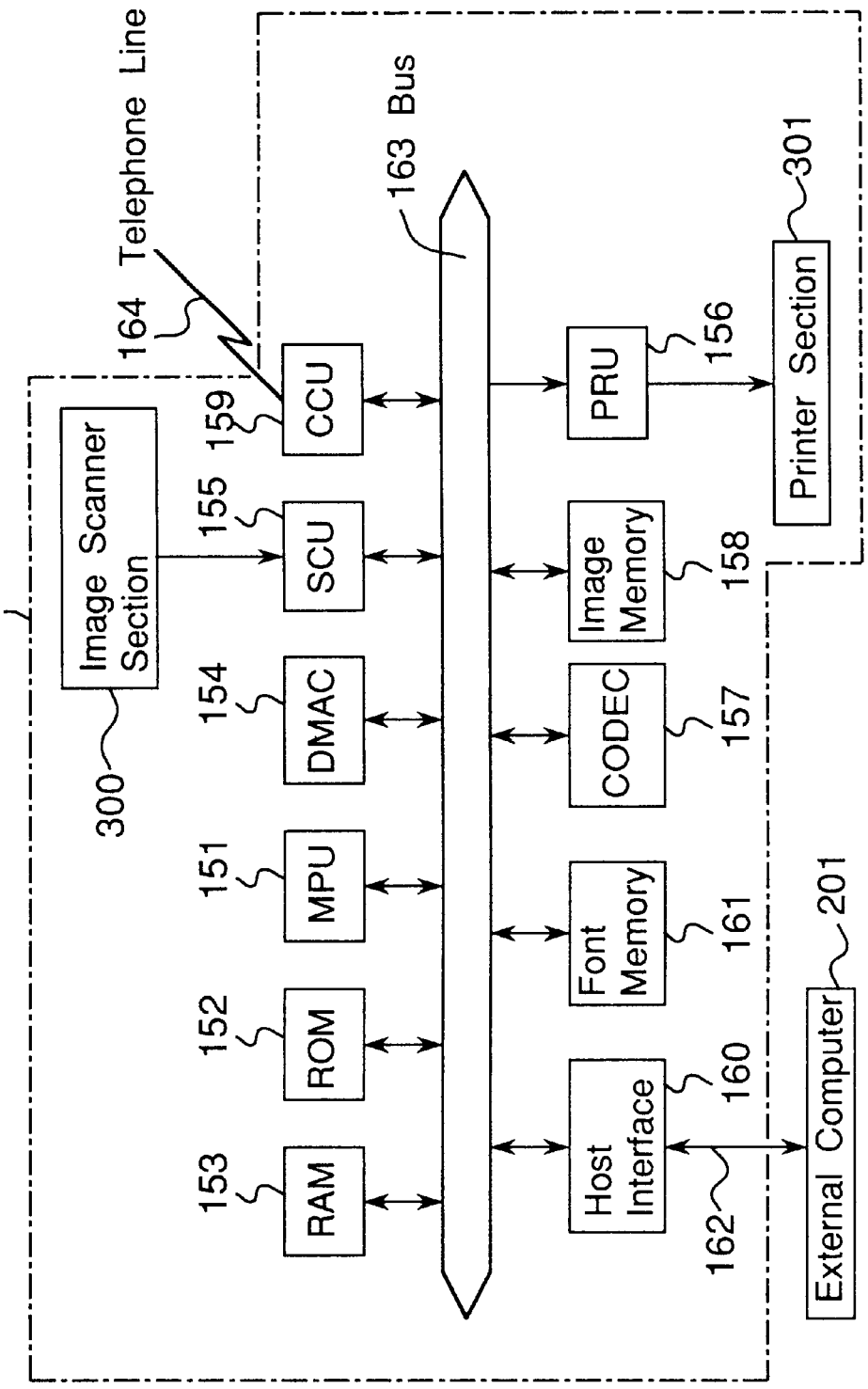
FIG. 5 is a block diagram of the conventional facsimile apparatus provided with the printer function shown in FIG. 4.

As apparent from comparison between FIGS. 1 and 5, the features of the facsimile apparatus 200 of the present preferred embodiment are as follows: it is unnecessary to provide the font memory 161, and further it is unnecessary to provide any font rasterizing means or means for developing image data into bit map image data.

Referring to FIG. 1, an MPU 51 controls the entire facsimile apparatus 200. A bus 63 is provided for the MPU 51, and is connected to the followings:

(a) a ROM 52;
(b) a RAM 53;
(c) a DMAC 54;
(d) an SCU 55;
(e) a PRU 56;
(f) a CODEC 57;
(g) an image memory 58 of a RAM;
(h) a CCU 59;
(i) a host interface 60; and
(j) a MODEM 70.

The ROM 52 stores not only an execution control program executed by the MPU 51 but also data required when executing the control program. The RAM 53 is used as a work area required by the MPU 51. The SCU 55 effects an image data processing process such as a shading correction process, a binarizing process or the like for image data sent from an image scanner section 300 for reading an image of a document and converting the image into an image signal. The PRU 56 controls a printer section 301 so as to output an image signal to the printer section 301 in synchronous with the printer section 301.

The CODEC 57 is constituted by a special large scale integrated circuit (a larger scale integrated circuit is referred to as an LSI hereinafter) for executing encoding and decoding of image data, wherein the process of the CODEC 57 includes an image compression process, an image expanding process, and so on. The facsimile encoding systems or methods used in the CODEC 57 include the followings:

(a) the MH (modified Huffman) coding system;
(b) the MR (modified READ (Relative Element Address Designate) coding system; and
(c) the MMR (modified modified READ) coding system, which are standardized in facsimile communication.

The image memory 58 stores encoded facsimile image data according to one of the above-mentioned coding systems. The CCU 59 executes communication control through the MODEM 70 through a telephone line 64.

The MODEM 70 is constituted by a special LSI for the MODEM 70, and comprises the following MODEM modes:

(a) a full-duplex type data communication mode or data communication MODEM mode conforming to CCITT (Now, ITU-T) Recommendation V.22 (referred to as a data communication mode hereinafter); and
(b) a half-duplex synchronous communication type facsimile communication mode or facsimile communication MODEM conforming to CCITT (Now, ITU-T) Recommendation V.29 (referred to as a facsimile communication mode hereinafter).

The MODEM 70 modulates a carrier wave signal according to facsimile image data encoded by the CODEC 57 or digital data transferred from the external computer 201, and then, transmits the modulated carrier wave signal through the telephone line 64 to a further facsimile apparatus or computer of the other party. On the other hand, the MODEM 70 receives a modulated carrier wave signal which is modulated according to facsimile image data or digital data and is transmitted from a further facsimile apparatus or computer of the other party through the telephone line 64, and then, demodulates the modulated carrier wave signal so as to generate facsimile image data or data, outputting the same to the CODEC 57 for decoding process or to the external computer 201 through the host interface 60.

The MODEM 70 is switched over between the above-mentioned two function modes according to a register flag set in a mode switching register 70r. This switchover operation between the two function modes is executed by the MPU 51 through setting in the mode switching register 70r of the MODEM LSI of the MODEM 70. In other words, when a register flag "0" is set to the mode switching register 70r, the MODEM 70 is set to the data communication MODEM mode and becomes a so-called data MODEM. On the other hand, when a register flag "1" is set to the mode switching register 70r, the MODEM 70 is set to the facsimile communication mode and becomes a so-called facsimile MODEM.

The DMAC 54 is a DMA controller for use in transmitting data among the CCU 59, the image memory 58, the CODEC 57, the SCU 55, and the PRU 56. The DMAC 54 is provided with a plurality of DMA channels.

The host interface 60 for interfacing the MPU 51 with the external computer 201 through signal conversion or the like is connected through the bus 63 to the MPU 51, and also is connected to the external computer 201 such as a microcomputer or the like.

FIG. 3A shows a control flow of image data in the stage of transmitting a document image through facsimile transmission. The following describes image data flow in the above-mentioned stage with reference to FIG. 3A.

Referring to FIG. 3A, a multi-bit image signal read by the image scanner section 300 is inputted to the SCU 55, and then, the SCU 55 performs a binarizing process, and outputs binarized image data. Thereafter, the binarized image data outputted from the SCU 55 is transferred to the CODEC 57 every horizontal scanning line. The CODEC 57 performs the MMR coding on the binarized image data outputted the SCU 55 so as to generate encoded facsimile image data. Then, the encoded facsimile image data is transferred to the image memory 58 through a DMA transfer by the DMAC 54.

When the encoded facsimile image data of one page of the document is stored in the image memory 58, the encoded facsimile image data of one page is transferred to the CCU 59 by the DMAC 54 through a DMA transfer, and then, the encoded facsimile image data is transmitted from the MODEM 70 through the telephone line 64 to a further facsimile apparatus of the other party.

In the above-mentioned stage, the MODEM 70 is set in the facsimile communication mode by the MPU 51. When an unoccupied area exists in the image memory 58, reading of the next document is executed without waiting the completion of the transmission of the encoded facsimile image data of one page through the telephone line 64. The area, in which of the image memory 58 the encoded facsimile image data of one page transferred through the telephone line 64 has been stored, is made to be usable as an unoccupied area.

FIG. 3B shows a control flow of image data in the facsimile reception stage. The following describes an image data flow in the above-mentioned stage with reference to FIG. 3B.

Referring to FIG. 3B, the encoded facsimile image data received from the further facsimile apparatus of the other party through the telephone line 64 is transferred to the image memory 58 through the MODEM 70 and the CCU 59 by the DMAC 54 through a DMA transfer. In the above-mentioned stage, the MODEM 70 is set to the facsimile communication mode by the MPU 51.

When the encoded facsimile image data of one page has been stored in the image memory 58, the printer section 301 is activated. The DMAC 54 successively transfers the encoded facsimile image data of one page stored in the image memory 58 to the CODEC 57 through a DMA transfer. The CODEC 57 decodes the encoded facsimile image data so as to generate image data. The DMAC 54 transmits line by line the image signal decoded by the CODEC 57 to the PRU 56 through a DMA transfer. The PRU 56 converts image data having a resolution of the decoded image signal into image data having a resolution of the printer section 301, and outputs the resulting converted image data to the printer section 301 in synchronous with the operation of the printer section 301.

When an unoccupied area exists in the image memory 58, received image data of the next page is transferred from the CCU 59 to the image memory 58 without waiting the completion of the transmission of the encoded facsimile image data of one page to the CODEC 57. The area, in which of the image memory 58 the encoded facsimile image data of one page used for the printing has been stored, is made to be usable as an unoccupied area.

Figure 2:
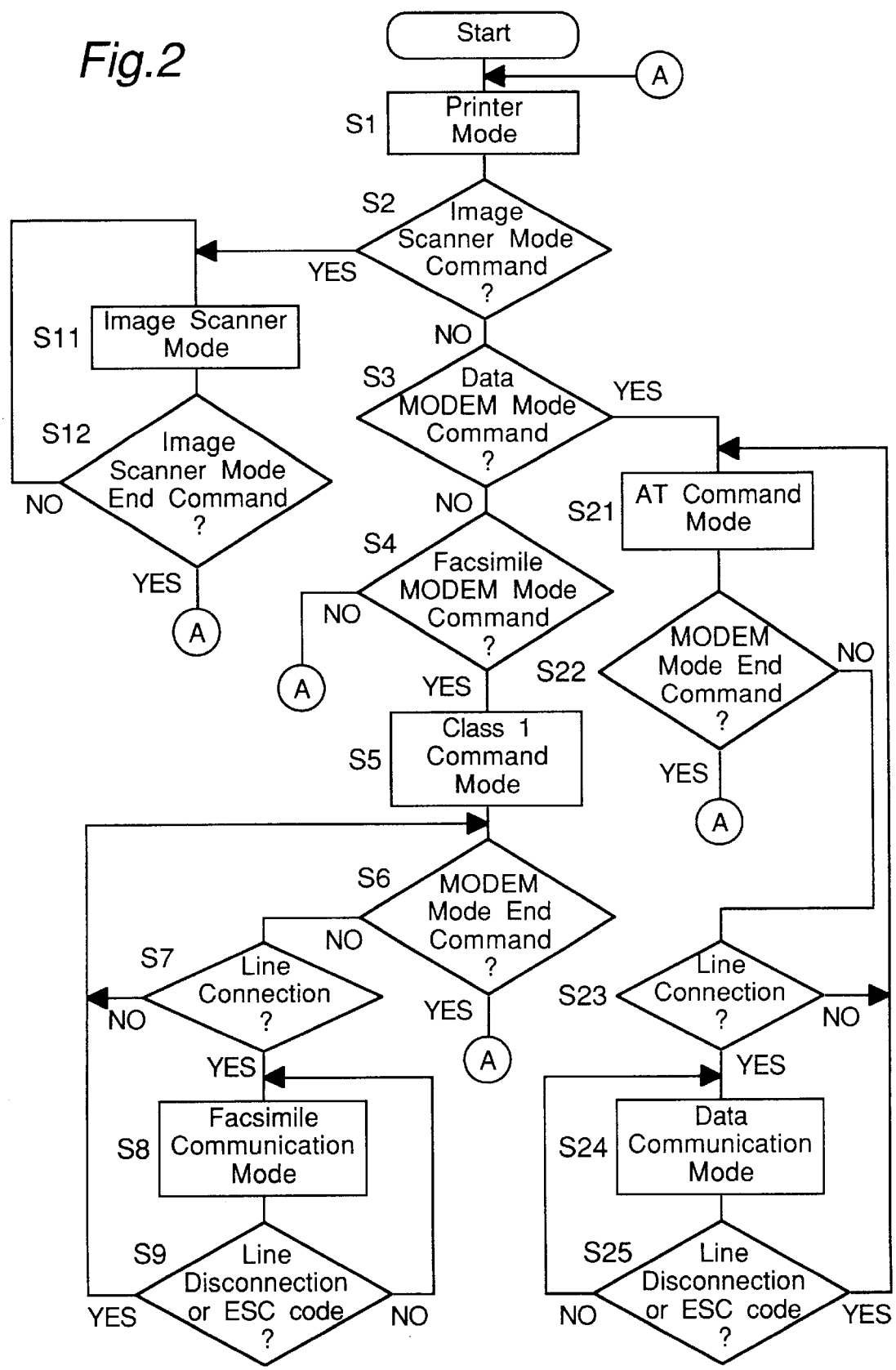
FIG. 2 is a flow-chart of a control flow showing mode transition of the facsimile apparatus provided with the printer function shown in FIG. 1.

FIG. 2 is a flow-chart of a control flow showing mode transition of the facsimile apparatus 200 function shown in FIG. 1. The control flow of the MPU 51 is described with reference to FIG. 2.

Referring to FIG. 2, the facsimile apparatus 200 comprises the following operation modes:

(a) a printer mode at step S1;

(b) an image scanner mode at step S11;

(c) an AT command mode for data transmission at step S21;

(d) a Class 1 command mode for facsimile transmission at step S5;

(e) a facsimile communication mode at step S8; and (f) a data communication mode at step S24.

When a power switch (not shown) is turned on, the control program shown in FIG. 2 is started, and then first of all, the printer mode is set in the facsimile apparatus 200 at step S1. In the printer mode, the print process is performed as described later in detail with reference to FIG. 3C. Thereafter, the program flow goes to step S2, and then, it is judged whether or not the MPU 51 receives an image scanner mode command from the external computer 201 through the host interface 60. Then it is judged at step S3 whether or not the MPU 51 receives a data MODEM mode command from the external computer 201 through the host interface 60, and thereafter, it is judged at step S4 whether or not the MPU 51 receives a facsimile MODEM mode command from the external computer 201 through the host interface 60.

If the MPU 51 receives the image scanner mode command at step S2, the program flow goes to step S11, and then, the facsimile apparatus 200 is set to the image scanner mode, in which the image scanning process is performed as described later in detail with reference to FIG. 3D. Thereafter, it is judged at step S12 whether or not the MPU 51 receives an image scanner mode end command from the external computer 201 through the host interface 60, and then if YES at step S12, the program flow goes back to step S1, whereas if NO at step S12, the program flow goes to step S11 and then the process of the image scanner mode is continuously performed.

If YES at step S3, the program flow goes to step S21, and then the process of the data communication mode is performed which will be described later in detail. At step S21, an AT command mode is set, and then it is judged at step S22 whether or not the MPU 51 receives a MODEM mode end command. If YES at step S22, the program flow goes back to step S1, whereas if NO at step S22, it is judged at step S23 whether or not a line connection through the telephone line 64 has been established. If NO at step S23, the program flow goes back to step S21, whereas if YES at step S23, the program flow goes to step S24 and then the data communication mode is set in the facsimile apparatus 200. Thereafter, it is judged at step S25 whether or not the line disconnection through the telephone line 64 has been established or the MPU 51 receives an ESC code. If NO at step S25, the program flow goes to step S24, whereas if YES at step S25, the program flow goes to step S21.

If NO at step S4, the program flow goes back to step S1, whereas if YES at step S4, the program flow goes to step S5 and then the process of the facsimile communication mode is performed which will be described later in detail. At step S5, the Class 1 command mode is set in the facsimile apparatus 200, and then it is judged at step S6 whether or not the MPU 51 receives a MODEM mode end command from the external computer 201 through the host interface 60. If YES at step S6, the program flow goes back to step S1, whereas if NO at step S6, it is judged at step S7 whether or not a line connection through the telephone liner 64 has been established. If NO at step S7, the program flow goes to step S6, whereas if YES at step S7, the facsimile communication mode is set at step S8 and then it is judged at step S9 whether or not the line disconnection through the telephone line 64 has been established or the MPU 51 receives an ESC code. If NO at step S9, the program flow goes to step S8, whereas if YES at step S9, the program flow goes to step S6.

FIG. 3C shows a control flow of image data in the stage or step S1 of FIG. 2 of printing print data sent from the external computer 201 such as a micro-computer including a micro-processor or the like by means of the printer section 301. The following describes the image data flow in the above-mentioned stage with reference to FIG. 3C.

Referring to FIG. 3C, print data of image data sent from the external computer 201 is received by the host interface 60 through the RS-232C line 62. The external computer 201 rasterizes or develops character data into bit map data, i.e., converts all of the print data into bit map data, and then, encodes the bit map data in a unit of one page according to the MMR coding system, outputting the resulting encoded facsimile image data or print data.

When the MS-WINDOWS made by Microsoft Corporation is, for example, used as an operating system (OS) of the external computer 201, this operating system has a font rasterizing function or font developing function. Therefore, the conversion of the print image data into bit map data on the side of the external computer 201 can be easily achieved. Furthermore, the MMR coding process on the side of the external computer 201 is executed by a printer driver which is software installed in the external computer 201.

The encoded facsimile print image data received by the host interface 60 is transferred to the image memory 58 by the DMAC 54 through a DMA transfer. When the encoded facsimile print image data of one page is stored in the image memory 58, the printer section 301 is activated. The DMAC 54 successively transfers the encoded facsimile print image data of one page stored in the image memory 58 to the CODEC 57 through a DMA transfer. The CODEC 57 decodes the encoded facsimile image data so as to generate image data. The DMAC 54 transfers line by line the image data decoded by the CODEC 57 to the PRU 56 through a DMA transfer. The PRU 56 outputs the image data to the printer section 301 in synchronous with the operation of the printer section 301. When an unoccupied area exists in the image memory 58, an encoded facsimile print image data of the next page is received from the external computer 201 through the host interface 60, and then are transferred to the image memory 58 without waiting the completion of the transmission of the encoded facsimile print image data of one page to the CODEC 57. The area, in which of the image memory 58 the encoded facsimile print data of one page used for the printing are stored, is made to be usable as an unoccupied area.

According to the facsimile apparatus 200 provided with the printer of the preferred embodiment of the present invention as described above, the decoding means of the facsimile apparatus 200 such as the CODEC 57 can be commonly used as decoding means in using the printer section 301 by executing the rasterization or bit map developing process and the encoding process in the external computer 201. In the above-mentioned arrangement, it is unnecessary to provide not only any font memory but also any high-performance microprocessor for font rasterization or font developing process. This results in reduction in the transmission time required for transmitting image data from the external computer 201 to the facsimile apparatus 200 provided with the printer function. Therefore, addition of the printer function to a stand-alone type facsimile apparatus can be achieved at a very low cost.

FIG. 3D shows a control flow of image data at step S11 of FIG. 2 in taking in document image data by means of an image scanner section 300 provided for the facsimile apparatus provided with the printer function. The following describes an image data flow in the above-mentioned stage with reference to FIG. 3D.

Referring to FIG. 3D, an image signal read out by the image scanner section 300 is inputted to the SCU 55, and the SCU 55 performs a binarizing process, outputting a binarized image data. The binarized image data outputted from the SCU 55 is transferred to the CODEC 57 every horizontal scanning line by the DMAC 54 through a DMA transfer. The CODEC 57 performs the MMR coding on the binarized image data outputted from the SCU 55 so as to generate encoded facsimile image data. Then the encoded facsimile image data is transferred to the image memory 58 by the DMAC 54 through a DMA transfer. When the encoded facsimile image data of one page of the document is stored in the image memory 58, the encoded facsimile image data of one page is transferred to the host interface 60 by the DMAC 54 through a DMA transfer, and then the host interface 60 transmits the encoded facsimile image data of one page to the external computer 201 through the RS-232C line 62.

According to the facsimile apparatus 200 provided with the printer function of the preferred embodiment of the present invention as described above, in the case of using the document image reading function of the facsimile apparatus 200 such as the image scanner section 300 under remote control of the external computer 201, the image data is compressed by the image data coding means of the facsimile apparatus 200 such as the CODEC 57, and then the compressed image data is outputted to the external computer 201. Therefore, the transmission time required for transmitting the image data can be reduced without increasing the manufacturing cost.

The following describes the case when YES at step S3 of FIG. 2, namely, in which the external computer 201 performs data communication through the telephone line 64 to a further computer of the other party such as a micro-computer or the like by means of the MODEM 70 of the facsimile apparatus 200.

When YES at step S3 of FIG. 2, namely, when the MPU 51 receives from the external computer 201 through the host interface 60 the data MODEM mode command for switching over the operation mode of the MODEM 70 of the facsimile apparatus 200 into the data communication mode, the MPU 51 sets the register flag "0" to the mode switching register 70r, and then, the MODEM 70 is set to the data communication mode and becomes the so-called data MODEM. Thereafter, the facsimile apparatus 200 of the present preferred embodiment is put in the same state as that of a data MODEM sold on the market, and then the facsimile apparatus 200 can receive an AT command which is one of the MODEM control commands at step S21 of FIG. 2. It is to be noted that interpretation of the AT command and control of the MODEM 70 are executed by the MPU 51.

In the data communication mode of step S24 of FIG. 2, the transmission digital data sent from the external computer 201 is transferred from the host interface 60 to the CCU 59 by the DMAC 54 through a DMA transfer. On the other hand, the received digital data from the further computer of the other party through the telephone line 64 is transferred from the CCU 59 to the host interface 60 by the DMAC 54 through a DMA transfer. In the case where the MPU 51 is enabled to receive the AT command, when the MPU 51 receives the MODEM mode end command from the external computer 201 or if YES at step S22 of FIG. 2, the system operation is switched over to the printer mode of step S1 of FIG. 2 which is capable of permitting reception of a print command and print data.

Then the following describes a case when YES at step S4 of FIG. 2, or in which the external computer 201 performs facsimile communication through the telephone line 64 by means of the MODEM 70 of the facsimile apparatus 200.

When YES at step S4 of FIG. 2 or when the MPU 51 receives the facsimile MODEM mode command for switching over the system operation to the facsimile communication mode from the external computer 201, the MPU 51 sets the MODEM 70 into the facsimile communication mode. Thereafter, the facsimile apparatus 200 is put at step S5 of FIG. 2 in the same state as that of the facsimile MODEM sold on the market to be enabled to receive the EIA (Electronics Industries Association) –578 or Class 1 command. Interpretation of the EIA-578 command and control of the MODEM 70 are executed by the MPU 51. In the case where the MPU 51 is enabled to receive the EIA-578 command, when the MPU 51 receives the MODEM mode end command from the external computer 201 through the host interface 60 (NO at step S6), the system operation is switched over to the printer mode of step S1 of FIG. 2.

When seeing the facsimile apparatus 200 from the external computer 201, the following function modes exist as shown in FIG. 2 showing a transition of the switchover between the function modes:

(a) the printer mode of step S2;

(b) the image scanner mode of step S11;

(c) the data communication mode of step S24; and (d) the facsimile communication mode of step S8.

The transition between the above-mentioned function modes takes place in response to the command sent from the external computer 201 through the host interface 60 and depending on the occurrence of connection or disconnection of the telephone line 64.

In the facsimile communication mode of step S8 of FIG. 2, a document image produced by the external computer 201 is rasterized or developed into a bit map image by means of the external computer 201, and then the developed bit map image is encoded into facsimile image data according to the facsimile coding method or system. Thereafter, the encoded facsimile image data is transmitted to the facsimile apparatus 200 through the host interface 60, and then the MODEM 70 of the facsimile apparatus 200 transmits the received encoded facsimile image data to a further facsimile apparatus of the other party.

In the present preferred embodiment, the telephone line 64 is used, however, the present invention is not limited to this. Alternatively, various kinds of communication lines may be used such as an ISDN line, or the like.

As described above, the facsimile apparatus 200 provided with the printer function of the preferred embodiment of the present invention has the MODEM 70 which can be switched over between the data communication mode and the facsimile communication mode. In this case, the function mode of the MODEM 70 can be switched over between the above-mentioned two function modes from the external computer 201 under remote control. This results in addition of the facsimile MODEM function and the data communication MODEM function into the external computer 201.

In the above-mentioned facsimile apparatus 200 of the preferred embodiment of the present invention, the decoding means for decoding encoded facsimile image data received from the further facsimile apparatus of the other party and the decoding means for decoding encoded facsimile image data received from said external computer can be commonly used, wherein these decoding means corresponds to the CODEC 57. Furthermore, it is unnecessary to provide the font memory 161 and any font rasterizing means or developing means for developing font data into bit map image data. This results in that the printer function can be added to the facsimile apparatus at a remarkably low cost.

Furthermore, in the case of utilizing a function for reading a document image from the external computer 201 under remote control, the facsimile apparatus 200 of the preferred embodiment compresses the image data by means of said encoding means such as the CODEC 57, and then outputs the compressed image data to the external computer 201. In this case, the transmission time for transmitting the image data to the external computer 201 can be reduced without increasing the manufacturing cost.

Furthermore, the facsimile apparatus 200 of the preferred embodiment of the present invention comprises the MODEM 70 having the facsimile MODEM mode and the data communication MODEM mode, and the switching means for switching over the MODEM mode therebetween. The above-mentioned arrangement allows data communication and facsimile communication from the external computer 201 through the facsimile apparatus 200 of the preferred embodiment to a further facsimile apparatus of the other party, to be achieved without increasing the manufacturing cost.

In addition, one communication port of the external computer 201 can be used commonly for connection of a printer, an image scanner, and a communication MODEM. Therefore, so many communication ports are not required.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A facsimile apparatus with a printer function, comprising:

receiving means operatively connected to a communication line, for receiving facsimile image data which is encoded according to a predetermined facsimile coding method and is transmitted from a further facsimile apparatus;

interface means operatively connected to an external computer, for interfacing said facsimile apparatus with said external computer and receiving facsimile image data which is encoded according to said facsimile coding method and is transmitted from said external computer;

decoding means for decoding both of the facsimile image data received by said interface means into image data, and the facsimile image data received by said receiving means into image data;

printer means for forming an image of the image data on a paper in response to the image data decoded by said decoding means;

image reading means for reading an image of a document and converting the read image of the document into image data;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line; and operation mode switching means for selectively switching an operation mode to be performed in said facsimile apparatus among the following mode:
 (a) a printer mode for controlling said interface means and said printer means to print the facsimile image data received from said external computer by said interface means;
 (b) a data MODEM mode for controlling said interface means and said modulator and demodulator means to perform a data communication between said external computer and a further external computer through said communication line;
 (c) a facsimile MODEM mode for controlling said interface means and said modulator and demodulator means to perform a facsimile communication between said external computer and a further facsimile apparatus through said communication line; and
 (d) an image scanner mode for controlling said interface means and said image reading means to output to said external computer the image data converted by said image reading means.

2. A facsimile apparatus with a printer function, comprising:

printer means for forming an image of image data in response to inputted image data;

image reading means for reading an image of a document and converting the read image of the document into image data;

encoding means for encoding both of the image data converted by said image reading means into first facsimile image data according to a predetermined facsimile coding method in a facsimile transmission mode, and the image data converted by said image reading means into second facsimile image data according to said facsimile coding method in an image scanning mode;

transmitting means, operatively connected to a communication line, for transmitting the first facsimile image data encoded by said encoding means to a further facsimile apparatus;

interface means, operatively connected to an external computer, for interfacing said facsimile apparatus with said external computer and transmitting the second facsimile image data encoded by said encoding means to said external computer;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line; and operation mode switching means for selectively switching an operation mode to be performed in said facsimile apparatus among the following modes:
 (a) a printer mode for controlling said interface means and said printer means to print the facsimile image data received from said external computer by said interface means;
 (b) a data MODEM mode for controlling said interface means and said modulator and demodulator means to perform a data communication between said external computer and a further external computer through said communication line;
 (c) a facsimile MODEM mode for controlling said interface means and said modulator and demodulator means to perform a facsimile communication between said external computer and a further facsimile apparatus through said communication line; and
 (d) an image scanner mode for controlling said interface means and said image reading means to output to said external computer the image data converted by said image reading means.

3. A facsimile apparatus with a printer function, comprising:

receiving means, operatively connected to a communication line, for receiving facsimile image data which is encoded according to a predetermined facsimile coding method and is transmitted from a further facsimile apparatus;

interface means, operatively connected to an external computer, for interfacing said facsimile apparatus with said external computer, receiving facsimile image data which is encoded according to said facsimile coding method and is transmitted from said external computer, and transmitting to said external computer facsimile image data which is encoded according to the facsimile coding method;

decoding means for decoding both of the facsimile image data received by said interface means into image data, and the facsimile image data received by said receiving means into image data;

image reading means for reading an image of a document and converting the read image of the document into image data;

encoding means for encoding both of the image data converted by said image reading means into first facsimile image data according to the facsimile coding method in a facsimile transmission mode, and the image data converted by said image reading means into second facsimile image data according to the facsimile coding method in an image scanning mode;

modulator and demodulator means operatively connected to a communication line, said modulator and demodulator means having a facsimile MODEM mode and a data communication MODEM mode, for in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line;

transmitting means, operatively connected to said communication line, for transmitting the first facsimile image data encoded by said encoding means to the further facsimile apparatus;

printer means for forming an image of the image data on a paper in response to the image data decoded by said decoding means; and operation mode switching means for selectively switching an operation mode to be performed in said facsimile apparatus among the following modes:
 (a) a printer mode for controlling said interface means and said printer means to print the facsimile image data received from said external computer by said interface means;
 (b) a data MODEM mode for controlling said interface means and said modulator and demodulator means to perform a data communication between said external computer and a further external computer through said communication line;
 (c) a facsimile MODEM mode for controlling said interface means and said modulator and demodulator means to perform a facsimile communication between said external computer and a further facsimile apparatus through said communication line; and
 (d) an image scanner mode for controlling said interface means and said image reading means to output to said external computer the image data converted by said image reading means.

4. A facsimile apparatus with a printer function, comprising:

interface means, operatively connected to an external computer, for interfacing said facsimile apparatus with said external computer, receiving facsimile image data and digital data transmitted from said external computer and transmitting facsimile image data and digital data to said external computer;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line;

switching means for switching over the MODEM mode of said modulator and demodulator means between the facsimile MODEM mode and the data communication MODEM mode in response to command data transmitted from said external computer through said interface means:

image reading means for reading an image of a document and converting the read image of the document into image data;

decoding means for decoding both of facsimile image data, which is encoded according to a predetermined facsimile coding method and transmitted from a further facsimile apparatus through said modulator and demodulator means, into image data, and facsimile image data, which is encoded according to said facsimile coding method and transmitted from said external computer through said interface means, into image data;

printer means for forming an image of image data on a paper in response to image data decoded by said decoding means; and operation mode switching means for selectively switching an operation mode to be performed in said facsimile apparatus among the following modes:
 (a) a printer mode for controlling said interface means and said printer means to print the facsimile image data received from said external computer by said interface means;
 (b) a data MODEM mode for controlling said interface means and said modulator and demodulator means to perform a data communication between said external computer and a further external computer through said communication line;
 (c) a facsimile MODEM mode for controlling said interface means and said modulator and demodulator means to perform a facsimile communication between said external computer and a further facsimile apparatus through said communication line; and
 (d) an image scanner mode for controlling said interface means and said image reading means to output to said external computer the image data converted by said image reading means.

5. A facsimile apparatus with a printer function, comprising:

interface means, operatively connected to an external computer, for interfacing said facsimile apparatus with said external computer, receiving facsimile image data and digital data transmitted from said external computer and transmitting facsimile image data and digital data to said external computer;

modulator and demodulator means operatively connected to a communication line, said modulator and demodulator means having a facsimile MODEM mode and a data communication MODEM mode, for, in said facsimile MODEM mode, modulating a carrier signal according to facsimile image data received by said interface means and demodulating a modulated carrier signal according to facsimile image data received through said communication line, and for, in said data communication MODEM mode, modulating a carrier signal according to digital data received by said interface means and demodulating a modulated carrier signal according to digital data received through said communication line;

switching means for switching over the MODEM mode of said modulator and demodulator means between the facsimile MODEM mode and the data communication MODEM mode in response to command data transmitted from said external computer through said interface means;

decoding means for decoding both of facsimile image data, which is encoded according to a predetermined facsimile coding method and transmitted from a further facsimile apparatus through said modulator and demodulator means, into image data, and facsimile image data, which is encoded according to said facsimile coding method and transmitted from said external computer through said interface means, into image data;

image reading means for reading an image of a document and converting the read image of the document into image data;

encoding means both for encoding the image data converted by said image reading means into first facsimile image data according to the facsimile coding method in a facsimile transmission mode, said first facsimile image data being transmitted through said modulator and demodulator means and said communication line to said further facsimile apparatus, and for encoding the image data converted by said image reading means into second facsimile image data according to the facsimile coding method in an image scanning mode, said second facsimile image data being transmitted through said interface means to said external computer;

printer means for forming an image of image data on a paper in response to image data decoded by said decoding means; and operation mode switching means for selectively switching an operation mode to be performed in said facsimile apparatus among the following modes:

(a) a printer mode for controlling said interface means and said printer means to print the facsimile image data received from said external computer by said interface means;

(b) a data MODEM mode for controlling said interface means and said modulator and demodulator means to perform a data communication between said external computer and a further external computer through said communication line;

(c) a facsimile MODEM mode for controlling said interface means and said modulator and demodulator means to perform a facsimile communication between said external computer and a further facsimile apparatus through said communication line; and (d) an image scanner mode for controlling said interface means and said image reading means to output to said external computer the image data converted by said image reading means.

* * * * *